United States Patent [19]

La et al.

[11] Patent Number: 5,228,075
[45] Date of Patent: Jul. 13, 1993

[54] TELEPHONE CAPABLE OF SELECTIVELY ACCEPTING CALLERS AND ENABLING PARTIAL RECOGNITION OF CALLERS

[75] Inventors: Sang T. La, Kwanakgu; Dong K. Hahn, Kangdongku, both of Rep. of Korea

[73] Assignee: Hyundai Electronics Co., Ltd., Kyoungkido, Rep. of Korea

[21] Appl. No.: 618,640

[22] Filed: Nov. 27, 1990

[30] Foreign Application Priority Data

Nov. 29, 1989 [KR] Rep. of Korea ............... 1989-17454
Nov. 30, 1989 [KR] Rep. of Korea ............... 1989-17889

[51] Int. Cl.$^5$ .................... H04M 1/57; H04M 1/64
[52] U.S. Cl. ............................ 379/67; 379/200; 379/386; 379/387; 379/424; 379/199
[58] Field of Search ............... 379/387, 424, 386, 360, 379/361, 355, 188, 199, 200, 67

[56] References Cited

U.S. PATENT DOCUMENTS

| 4,266,098 | 5/1981 | Novak | 379/142 |
| 4,791,664 | 12/1988 | Lutz et al. | 379/188 |
| 4,802,202 | 1/1989 | Takahashi et al. | 379/67 |
| 4,817,133 | 3/1989 | Takahashi et al. | 379/142 |
| 4,924,496 | 5/1990 | Figa et al. | 379/142 |

Primary Examiner—James L. Dwyer
Assistant Examiner—Fan Tsang
Attorney, Agent, or Firm—Darby & Darby

[57] ABSTRACT

A telephone set capable of selectively accepting callers and enabling partial recognitions of callers is disclosed, and the telephone set includes: tip and ring terminals; a first analogue switch connected to said tip terminal; a first bridge diode connected to the first analogue switch and the ring terminal; a wave rectifying circuit connected to the first bridge diode; a microprocessor connected to the wave rectifying circuit and the first analogue switch; an EEPROM connected to the microprocessor; a hook switch connected to the microprocessor; a selecting switch connected to the microprocessor; a second bridge diode connected to the tip and ring terminals; a hybrid IC circuit connected to the second bridge diode; a DTMF decoder connected to the hybrid IC circuit and the microprocessor; a power supply means for supplying the required power to the internal circuits; and a second analogue switch and a microphone.

4 Claims, 1 Drawing Sheet

TELEPHONE CAPABLE OF SELECTIVELY ACCEPTING CALLERS AND ENABLING PARTIAL RECOGNITION OF CALLERS

BACKGROUND OF THE INVENTION

The present invention relates to a telephone set which is capable of selectively accepting the callers, and enables to partially recognize the callers.

Conventionally, there has been no telephone which is capable of selectively accepting the callers by identifying the stored secret codes, and by partially recognizing the callers.

SUMMARY OF THE INVENTION

It is an object of the present invention to provide a telephone which is capable of selectively accepting the callers and partially recognizing the callers.

In achieving the above object, secret codes are set up in advance, and if a telephone call arrives and if the receiver is picked up, the secret code and the name of the caller can be displayed upon pressing the key of the secret code.

Thus the identity of the caller can be recognized, and if the caller has no secret code, the telephone call is automatically disconnected.

It is another object of the present invention to provide a selectively caller-accepting and partially caller-recognizing telephone set in which a recorded voice is transmitted in a form such as "Please press the secret code key".

BRIEF DESCRIPTION OF THE DRAWINGS

The above objects and other advantages of the present invention will become more apparent by describing in detail the preferred embodiment of the present invention with reference to the attached drawings in which.

DESCRIPTION OF THE PREFERRED EMBODIMENT

Figure 1:
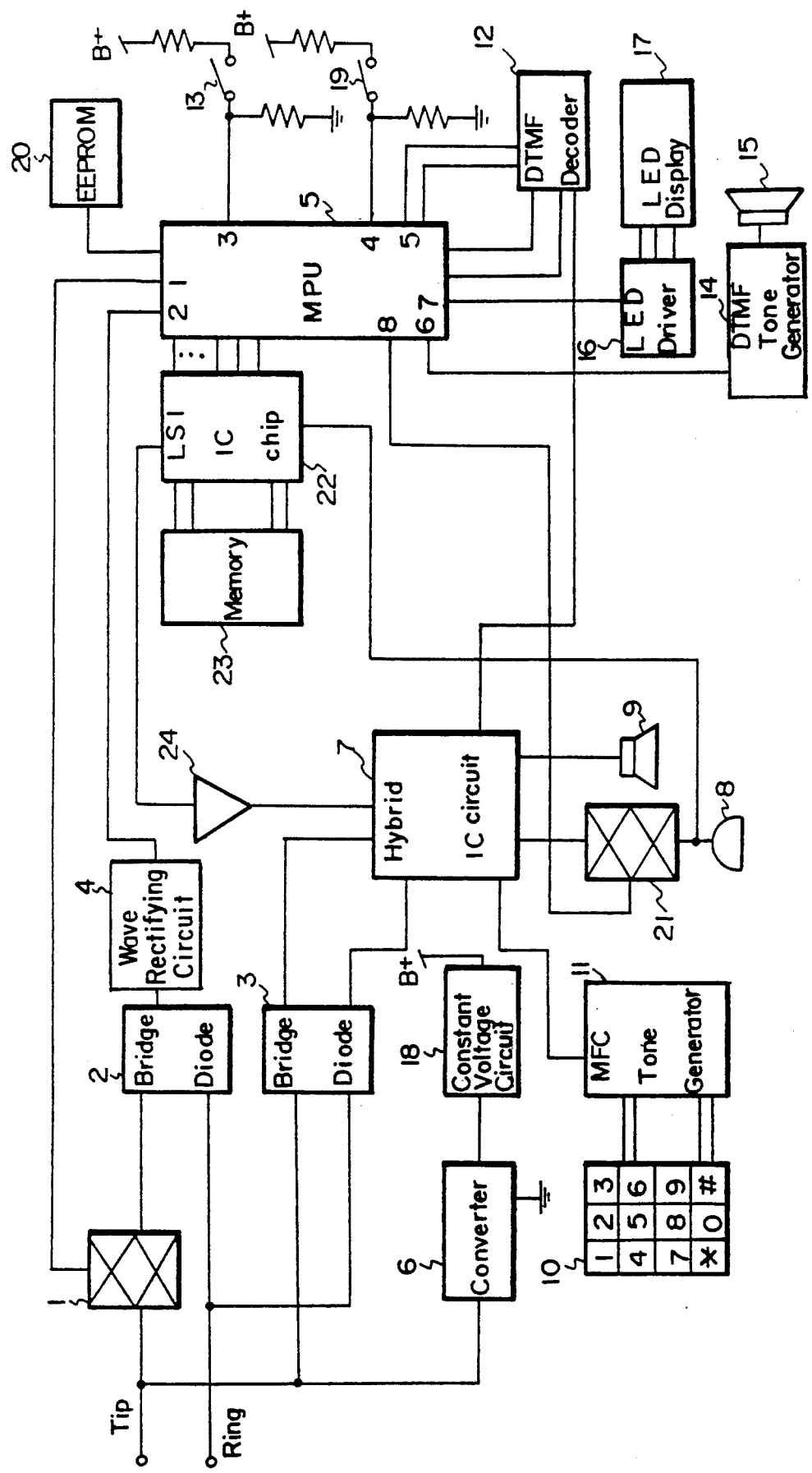
FIG. 1 illustrates the preferred embodiment of the present invention.

FIG. 1 illustrates the constitution of the present invention, and as shown in this drawing, the telephone set of the present invention includes: an analogue switch 1, bridge diodes 2,3 a wave rectifying circuit 4, a microprocessor MPU 5, a DC-DC converter 6, a hybrid IC circuit 7, a microphone 8, an ear piece 9, a key pad 10, an MFC tone generator 11, a DTMF decoder 12, a hook switch 13, a DTMF tone generator 14, a speaker 15, an LED driver 16, an LED display 17, a constant voltage circuit 18, a selection switch 19, an EEPROM 20, an analogue switch 21, a voice recording and regenerating LSI IC chip 22, a non-volatile memory section 23, and an amplifier 24.

A 48 DC voltage which is supplied to the tip and ring terminals is also supplied through the DC-DC converter 6 and the constant voltage circuit 18 into the internal circuits.

When the selecting switch 19 lies in the normal position, an output port (1) of the processor 5 is in a high state, and therefore, when a telephone call arrives, a 20 Hz ring tone which is loaded in the DC current is outputted in the form of high signals through the bridge diode 2 and through the rectifying circuit 4. Then these output signals are introduced into an input pin (2) of the processor 5 to output a port (6) to a high state, and consequently, the DTMF tone generator 14 is driven, with the result that a ring tone is outputted through the speaker.

Under this condition, if the telephone receiver is picked up, the hook switch 13 is opened, so that low signals should be inputted through an input port (3) of the processor 5.

Then the output port (1) of the processor 5 is converted to a low state, and consequently, the analogue switch 1 is opened.

Then a circuit loop is formed toward the bridge diode 3, and the impedance is lowered, so that the switching system of telephone station should be able to know the pick-up of the receiver. After the continuation of the talks for a certain period of time, if the receiver is hung up, then the output port (1) of the processor 5 is converted to a high state, so that the circuit loop connecting through the tip and ring should be directed toward the bridge diode 2 again.

Then if the selecting switch 19 is set to "selection", the output port (1) of the processor 5 is converted to a low state in the same manner as described above upon arriving of a phone call, thereby opening the analogue switch 1. The microprocessor 5 assigns addresses to the voice recording and regenerating LSI IC chip 22, so that the LSI IC chip 22 should be able to send to the amplifier 24 the voice recorded in the non-volatile memory section after regenerating it. Then the output of the amplifier 24 is delivered to the hybrid IC circuit 7, so that it should be transmitted to the other party. Under this condition, if the telephone caller pushes the secret code key, the DTMF tone is transferred through the bridge diode 3 and the hybrid IC circuit 7 to the DTMF decoder 12 where the tone is converted to a 4-bit data, before it enters into the microprocessor 5. The microprocessor 5 compares the inputted secret code with the secret code stored in the EEPROM 20, and if the comparison shows a difference, the output port (1) of the microprocessor 5 is converted to a high state, so that the analogue switch 1 should be short-circuited, and that the tip and ring should have a high impedance. Then the switching system of the telephone station decides that the receiver is hung up, thereby terminating the phone communication.

On the other hand, if the comparison of the secret codes shows an identicality, then the LED driver 16 is driven, and the secret code and the English name of the caller are displayed. At the same time, the DTMF tone generator 14 is driven, and a ring tone is outputted through the speaker 15. If the receiver is not picked up for the succeeding 3 minutes, and thus, if the input port (3) of the microprocessor 5 maintains a high state, the switching system decides that the person at the receiving end has no intention to receive the phone call, thereby short-circuiting the analogue switch 1 to terminate the calling.

If the phone is received upon ringing of the ring tone, that is, if the receiver is picked up, the input port(3) of the processor 5 is converted to a low state through the hook switch 13, and then, an output port(8) of the processor 5 is converted to a high state, so that the analogue switch 21 should be turned on, and that a transmission to the microphone 8 should become possible. If the receiver is hung up to terminate the talking, that is, if the input port(3) of the processor 5 is converted to a high state, then the analogue switch 21 is opened, and the analogue switch 1 is shortcircuited, so that tip and ring loops should have a high impedance, thereby notifying the termination of the phone communication to the switching system.

If the calling party terminates spontaneously so as for a busy tone to be rung, the microprocessor 5 opens the analogue switch 21 through the DTMF tone decoder 12, and also turns on the analogue switch 1, so that the tip and ring loops should have a high impedance, thereby putting the telephone set to a normal waiting state. The inputting of a secret code is carried out in such a manner that a secret code is inputted through the key pad 10. Then the data is passed through the MFC tone generator 11, the hybrid IC circuit 7 and the DTMF decoder 12 to the microprocessor 5 which then transfers the data of the secret code into the EEPROM 20. In a state with the receiver hung up, the secret code of one's own self after pushing the "*" key of the key pad 10 is inputted, and only then, one's address, telephone number, and English name can be inputted.

If the secret code is to be changed, the data can be inputted in the above described order after pushing the "#" key.

For example, if the words "Please push the secret code key" are to be inputted into the non-volatile memory section 23, it can be inputted through the key pad. In a state with the receiver picked up, the selection switch of the present invention is set to the selection mode, and then, the "*", "#", "0" keys are pushed. Then the microprocessor 5 sets the port(8) to a high state, so that the input from the microphone 8 should be received. Thereafter, the voice is stored into the non-volatile memory section 23 by controlling the LSI IC chip 22.

After completion of the inputting, the "*", "#", "0" keys are pushed again.

Conventionally, telephone set is utilized in HA(home automation) in such a manner that it can control the various home articles after pushing the secret code.

According to the present invention, the secret codes are compared, and if the secret codes are different each other, the phone call is automatically disconnected. Further, the secret code and the name of the caller are visually displayed, so that the receiver should be able to receive in a selective manner.

Further, a recorded message can be transmitted to the person using a secret code.

What is claimed is:

1. A telephone set capable of selectively accepting calls, comprising:
   tip and ring terminals;
   a first analog switch connected to said tip terminal;
   a first bridge diode connected to both said first analog switch and said ring terminal;
   a wave rectifying circuit connected to said first bridge diode;
   a microprocessor connected to both said wave rectifying circuit and said first analog switch, said microprocessor being responsive to signals on said tip and ring terminals and controlling said first analog switch to selectively terminate or accept calls based on said signals;
   an EEPROM (Electrically Erasable and Programmable ROM) connected to said microprocessor for storing caller codes;
   a hook switch connected to said microprocessor, said microprocessor also being responsive to actuation of said hook switch for controlling said first analog switch;
   a selecting switch connected to said microprocessor such that in a first state of said selecting switch said microprocessor is disabled from being responsive to said signals;
   a second bridge diode connected to both of said tip and ring terminals;
   a hybrid IC circuit connected to said second bridge diode;
   a DTMF (Dual Tone Multi-Frequency) decoder connected to both said hybrid IC circuit and said microprocessor for converting said signals to caller data, said microprocessor accepting a call when said caller data matches a caller code stored in said EEPROM;
   a second analog switch connected to both said hybrid IC circuit and said microprocessor; and
   a microphone connected to said second analog switch, said second analog switch being controlled by said microprocessor to connect said microphone to said hybrid IC circuit when said microprocessor accepts a call.

2. The telephone set as claimed in claim 1, further comprising:
   a voice recording and regenerating means connected to both said microprocessor and said microphone for recording sound signals input to said microphone;
   a non-volatile memory means connected to said voice recording and regenerating means for storing said sound signals; and
   an amplifier connected to both said voice recording and regenerating means and said hybrid IC circuit for outputting stored sound signals to said hybrid IC circuit.

3. The telephone set as claimed in claim 1, further comprising:
   tone generator means connected to said microprocessor; and
   a speaker connected to said tone generator means, said tone generator means outputting a tone through said speaker when said microprocessor accepts a call.

4. The telephone set as claimed in claim 1, further comprising:
   an LED driver connected to said microprocessor; and
   an LED display connected to said LED driver 16 said LED driver energizing said LED display when said microprocessor accepts a call.

* * * * *